(12) United States Patent
Hiraka

(10) Patent No.: US 7,242,632 B2
(45) Date of Patent: Jul. 10, 2007

(54) MEMORY DEVICE, MEMORY MANAGING METHOD AND PROGRAM

(75) Inventor: Seiji Hiraka, Sendai (JP)

(73) Assignee: Tokyo Electron Device Limited, Kanagawa (JP)

(*) Notice: Subject to any disclaimer, the term of this patent is extended or adjusted under 35 U.S.C. 154(b) by 230 days.

(21) Appl. No.: 10/519,229

(22) PCT Filed: Jun. 17, 2003

(86) PCT No.: PCT/JP03/07673

§ 371 (c)(1),
(2), (4) Date: Dec. 20, 2004

(87) PCT Pub. No.: WO04/001606

PCT Pub. Date: Dec. 31, 2003

(65) Prior Publication Data

US 2006/0062041 A1    Mar. 23, 2006

(30) Foreign Application Priority Data

Jun. 20, 2002    (JP)  ............................. 2002-179902

(51) Int. Cl.
*G11C 8/00*  (2006.01)
(52) U.S. Cl. ...................... 365/230.03; 365/185.29; 365/185.33; 365/218
(58) Field of Classification Search ........... 365/230.03, 365/218, 185.29, 185.33; 36/185.33
See application file for complete search history.

(56) References Cited

U.S. PATENT DOCUMENTS 5,428,579 A * 6/1995 Robinson et al. ...... 365/230.03
5,761,122 A * 6/1998 Nakamura et al. ...... 365/185.21
5,901,089 A * 5/1999 Korsh et al. ........... 365/185.24
5,987,573 A * 11/1999 Hiraka .................... 711/156
6,865,122 B2 * 3/2005 Srinivasan ................ 365/200

FOREIGN PATENT DOCUMENTS

| JP | 09-093523 | 4/1997 |
| JP | 2000-510634 A | 8/2000 |
| JP | 2002-537596 A | 11/2002 |
| WO | WO 9944113 | 9/1999 |
| WO | WO 00/49488 A | 8/2000 |
| WO | WO 0049488 | 8/2000 |

* cited by examiner

*Primary Examiner*—Richard T. Elms
*Assistant Examiner*—Eric Wendler
(74) *Attorney, Agent, or Firm*—Mitchell P. Brook, Esq.; Luce, Forward, Hamilton & Scripps LLP

(57) ABSTRACT

A memory device, performs fast data renewal and erasure, and is not easily degraded. In the memory area of a flash memory, each block is divided into physical pages and each physical pages is divided into logical pages. A redundancy portion is provided for each physical page. When supplied with to-be-written data and the logical address of a write destination, a CPU writes this data in an empty logical page and allocates the supplied logical address to this logical page. An old data flag in the redundancy portion in that physical page which includes a logical page having old data stored therein is changed in such a way as to indicate that data in this logical page is invalid. New data writing is done in that logical page to which a logical address is not allocated. At the time of flash-erasing a block, data which is stored in that logical page which is indicated by the old data flag is not transferred.

12 Claims, 11 Drawing Sheets

MEMORY DEVICE, MEMORY MANAGING METHOD AND PROGRAM

TECHNICAL FIELD

The present invention relates to a memory device, a memory managing method and a program, and, more particularly, to a block erasure type memory device, and a memory managing method and a program which manage a block erasure type memory device.

BACKGROUND ART

In addition to a hard disk unit and a floppy (registered trademark) disk, an EEPROM (Electrically Erasable/Programmable Read Only Memory) flash memory is used as a recording medium which is accessible (data readable and erasable) by a computer or the like. In case where a flash memory is used to store files under the control of a disk operating system, such as MS-DOS (registered trademark) or Windows (registered trademark), each of which is a product of Microsoft Corporation, the control becomes easy if a scheme using data read/write units (e.g., 512 bytes), which has conventionally been used at the time of using a hard disk unit, is employed.

The unit of the memory capacity of a flash memory in case where data is read or written (this unit being generally called "page" or "sector") is larger than the unit of the memory capacity in case of erasing data (the latter unit being generally called "block"). In case of storing data, the logic state of memory units (cells) can be changed only in one direction (e.g., in the direction from "1" to "0") and setting the memory units to the initial state (e.g., "1") requires an operation to erase the memory contents block by block (flash erase).

In case of renewing or erasing data stored in the flash memory, therefore, that data in a block containing data to be renewed which is not to be renewed is transferred to another block first. Then, the block containing data to be renewed is flash-erased or renewed data is written in that block.

Of flash memories, particularly, a NAND type has a difficulty in sufficiently preventing the occurrence of defective blocks which cannot carry out the proper data storage at the manufacturing stage. To cope with the difficulty of the conventional flash memory, therefore, consecutive logical addresses separate from physical addresses allocated to the respective blocks are dynamically allocated to proper blocks and an address translation table which shows the correlation between the physical addresses and the logical addresses is prepared to avoid complication of external access procedures which may be originated from addresses becoming discontiguous.

In case of renewing or erasing data stored in the flash memory, conventionally, all the pieces of data in a block containing data to be renewed or erased were read out. Therefore, data reading took time, which would eventually make the time needed to rewrite or erase data very long as a whole.

In case of rewriting a file whose amount of data is very small as compared with the memory capacity for one block, the flash memory flash-erases a block that contains lots of pages which store data irrelevant to the file and pages which are not holding data. While a NAND type flash memory can achieve a large-capacity structure at a low cost, it would be too degraded to perform proper data reading and writing by repetitive flash erase.

Therefore, the execution of the aforementioned operation rewrites a small amount of data, which results in inefficient frequent flash erase. This quickens the degrading of the flash memory.

Particularly, the memory capacity of the flash memory larger has become very huge to increase the memory capacity per page and the memory capacity per block considerably larger; for example, the memory capacity has increased to about two Kbytes per page or about 128 Kbytes per block.

Further, the increased memory capacity of the flash memory increases the case where the memory capacity which is physically equivalent to one page (hereinafter called "physical page") is virtually divided into plural memory areas (hereinafter called "logical pages") and is used in that form. In case where a physical page is divided into plural logical pages and is used in that form, even when data to be renewed or erased does not amount to one physical page, a block which holds this data is erased.

This further calls for the need for prevention of inefficient flash erase.

DISCLOSURE OF INVENTION

The invention has been made in consideration of the above-described situations and aims at providing a memory device which performs fast data renewal and erasure and a memory managing method which executes fast renewal and erasure of data stored in a memory device.

It is another object of the invention to provide a memory device which is not easily degraded and a memory managing method which makes the degrading of a memory device harder.

To achieve the objects, a memory device according to the first aspect of the invention comprises:

a memory (11) including a plurality of memory blocks which stores data and each of which is comprised of one or more physical pages each including one or more logical pages; and a controller (12, S314, S308 to S310) which, when to-be-written data is supplied to the memory device, writes the to-be-written data in that empty logical page in the logical pages which is in a data storable state, discriminates whether to-be-replaced data to be replaced with the to-be-written data is stored in the logical pages, and writes validity data indicating that the to-be-replaced data is not valid in that physical page which includes the logical page that stores the to-be-replaced data, when having discriminated that the to-be-replaced data is stored in the logical page.

In the memory device, to-be-replaced data (old data before renewal in case of renewing data) is indicated as invalid by the validity data instead of being erased. Therefore, inefficient flash erase need not be performed on memory blocks at the time of renewal, thus suppressing the degrading of the memory device.

Further, the location of invalid data is specified by referring to the validity data. Even if reading of data in a logical page indicated by the validity data is omitted in case of erasing the memory contents of a memory block, it is possible to properly erase the invalid data while saving valid data in another memory block. This can make data renewal and erasure faster.

Physical addresses may be allocated to the logical pages in which case the memory device may comprise, for example, a memory (123) for storing an address translation table representing a correlation between the physical addresses of the logical pages and logical addresses to be used to specify the logical pages by an external unit, and a memory (123) for storing a write pointer that points the empty logical page in the logical pages which is in a data storable state and instructs the physical address of the specified empty logical page, and when to-be-written data and a logical address are supplied to the memory device, the controller (12) may write the to-be-written data in the empty logical page pointed by the write pointer, and renew the address translation table in such a way as to show a correlation between the physical address of the empty logical page and the logical address (S321).

This structure eliminates the need for an operation of searching for a new empty block (a block where user data is not stored) and writing data every time data writing takes place. Even in case where erasure of old data accompanies data writing (specifically, in case of performing data rewriting), inefficient flash erase need not be performed on memory blocks, thus suppressing the degrading of the memory device.

The controller (12) may write validity data indicating that the written to-be-written data is valid in the physical page which includes the logical page where the to-be-written data is stored (S314). In this case, the logical page where data is not stored may be specified based on the validity data and the specified logical page may be treated as the empty logical page.

The area where the validity data is to be written is an area which is not included in any one of logical pages in that physical page which includes the logical page that stores the to-be-read page.

The controller (12) may discriminate whether or not data stored in each of the logical pages in to-be-erased memory blocks is valid based on the validity data (S501), specify that logical pages which are located in another memory blocks and where data is not stored and transfer that data which has been discriminated as valid into the specified logical pages (S502 and S503, S507), and erase data stored in the to-be-erased memory blocks (S504).

When information for specifying a to-be-read logical page to be read out is supplied to the memory device, the controller (12) may specify the to-be-read logical page based on the information, read data from the specified to-be-read logical page and send the read data outside (S201 to S214).

According to the second aspect of the invention, there is provided a memory managing method of managing a memory (11) including a plurality of memory blocks which stores data and each of which is comprised of one or more physical pages each including one or more logical pages, characterized by comprising the steps of:

writing, when to-be-written data is supplied to the memory, the to-be-written data in that empty logical page in the logical pages which is in a data storable state (S314); and discriminating whether to-be-replaced data to be replaced with the to-be-written data is stored in the logical pages, and writing validity data indicating that the to-be-replaced data is not valid in that physical page which includes the logical page that stores the to-be-replaced data, when it is discriminated that the to-be-replaced data is stored in the logical page (S308 to S310).

According to the memory managing method, to-be-replaced data (old data before renewal in case of renewing data) is indicated as invalid by the validity data instead of being erased. Therefore, inefficient flash erase need not be performed on memory blocks at the time of renewal, thus suppressing the degrading of the memory device.

Further, the location of invalid data is specified by referring to the validity data. Even if reading of data in a logical page indicated by the validity data is omitted in case of erasing the memory contents of a memory block, it is possible to properly erase the invalid data while saving valid data in another memory block. This can make data renewal and erasure faster.

According to the third aspect of the invention, there is provided a program for allowing a computer (121), connected to a memory (11) including a plurality of memory blocks which stores data and each of which is comprised of one or more physical pages each including one or more logical pages, to function to:

write, when to-be-written data is supplied to the memory, the to-be-written data in that empty logical page in the logical pages which is in a data storable state (S314); and discriminate whether to-be-replaced data to be replaced with the to-be-written data is stored in the logical pages, and write validity data indicating that the to-be-replaced data is not valid in that physical page which includes the logical page that stores the to-be-replaced data, when it is discriminated that the to-be-replaced data is stored in the logical page (S308 to S310).

With the use of a computer which executes this program, to-be-replaced data (old data before renewal in case of renewing data) is indicated as invalid by the validity data instead of being erased. Therefore, inefficient flash erase need not be performed on memory blocks at the time of renewal, thus suppressing the degrading of the memory device.

Further, the location of invalid data is specified by referring to the validity data.

Even if reading of data in a logical page indicated by the validity data is omitted in case of erasing the memory contents of a memory block, it is possible to properly erase the invalid data while saving valid data in another memory block. This can make data renewal and erasure faster.

BEST MODE FOR CARRYING OUT THE INVENTION

One embodiment of the invention will be described below, taking a memory system equipped with a flash memory as an example, with reference to the accompanying drawings.

Figure 1:
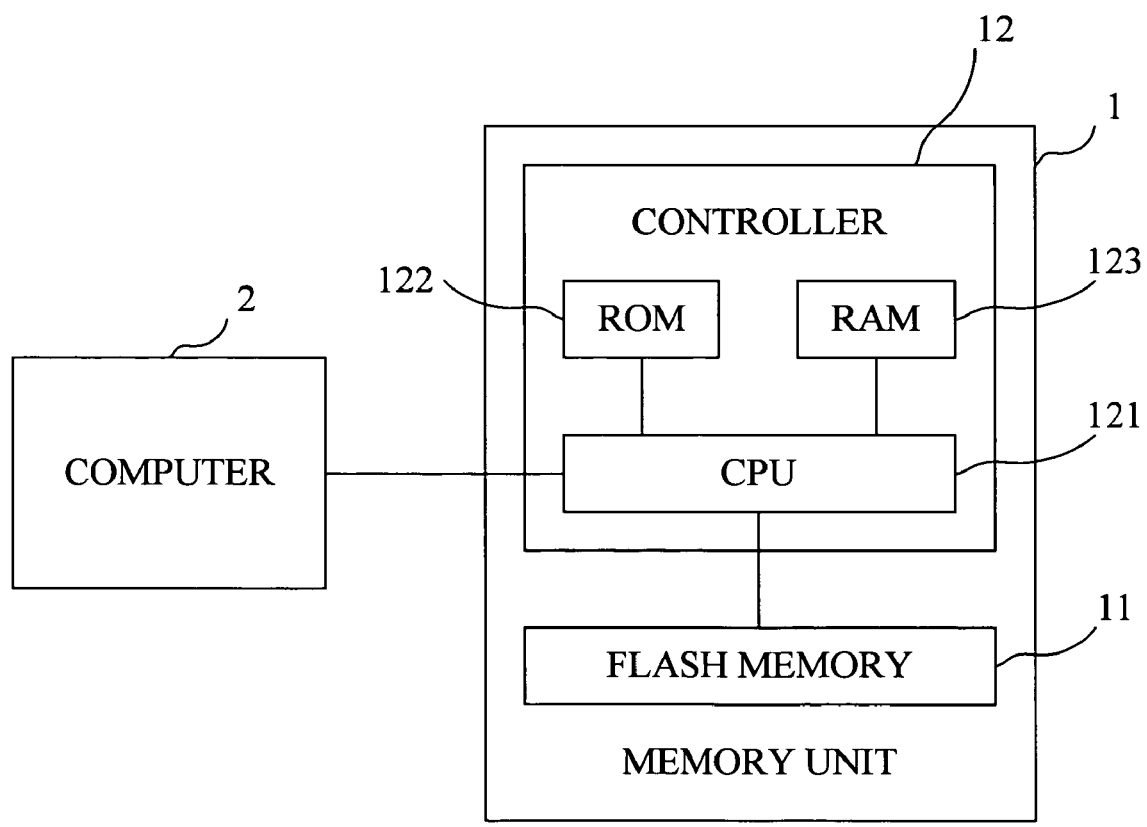
FIG. 1 is a block diagram illustrating the structure of a memory system according to one embodiment of the invention.

FIG. 1 is a block diagram illustrating the physical structure of the memory system according to the embodiment of the invention.

As illustrated, the memory system comprises a memory unit 1 and a computer 2. The memory unit 1 is attached in a detachable manner to the computer 2 via a slot provided in the computer 2.

The slot of the computer 2 comprises, for example, a PCMCIA slot for relaying a PCMCIA bus.

The memory unit 1 comprises a flash memory 11 and a controller 12.

The flash memory 11 is comprised of a memory device, such as EEPROM (Electrically Erasable/Programmable Read Only Memory).

In response to an access made by the controller 12, the flash memory 11 stores data supplied from the computer 2, supplies stored data to the computer 2 and erases stored data.

Figure 2:
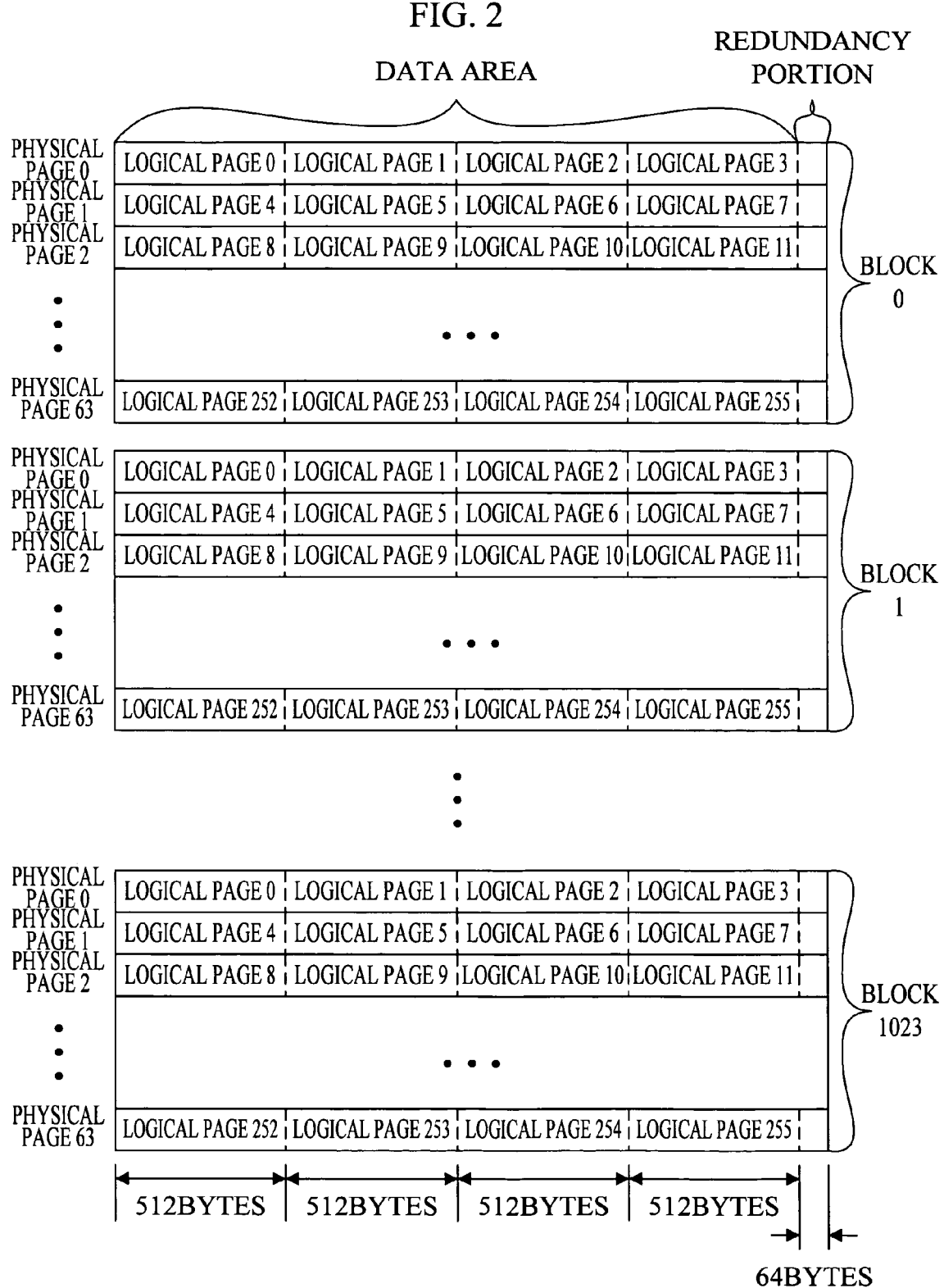
FIG. 2 is a diagram exemplarily showing the logical structure of the memory area of a flash memory.

The memory area the flash memory 11 has consists of, for example, 65,536 physical pages as shown in FIG. 2, each physical page having a memory capacity of 2,112 bytes.

Each physical page is comprised of four logical pages each consisting of 512 bytes and a redundancy portion which occupies the last 64 bytes of the physical page. Memory cells included in each logical page are given consecutive addresses from "0" to "511".

As illustrated, each logical page consists of a data area which occupies an area of 512 bytes from the top and a redundancy portion which occupies an end area of 64 bytes.

User data (data supplied from the computer 2 and written or data to be supplied to the computer 2) is stored in a logical page.

An ECC (Error-Correcting Code) for checking if the contents of user data stored in each logical page which belongs to the same physical page as the redundancy portion does are not corrupted and a defective block flag are stored in the redundancy portion.

The defective block flag is data indicating whether a block (to be discussed later) to which a physical page where the defective block flag is stored belongs is a block capable of properly storing data (good block), a block which is not a good block, i.e., a defective block and has been decided as defective before shipment by the manufacturer or the like of the flash memory 11 (initially defective block), or a block which is a defective block and is decided as being unable to properly store data during the use of the flash memory 11 (later-generated defective block).

It is to be noted that the defective block flag that shows a good block can be updated so as to be able to indicate a later-generated defective block when it is overwritten with a value indicating a later-generated defective block.

A NAND type flash memory can overwrite a value "0" in a memory cell storing a value "1". (This type of flash memory cannot overwrite a value "1" in a memory cell storing a value "0" and a block including this memory cell should be flash-erased (to be discussed later) once.)

Suppose therefore that the flash memory 11 is a NAND type flash memory and the defective block flag consists of data of two bits. In this case, provided that a value indicating a good block is "11", a value indicating a later-generated defective block is "01" or "10" and a value indicating an initially defective block is "00", the defective block flag can be updated to show a later-generated defective block as it is overwritten with the value that indicates a later-generated defective block. This manipulation eliminates the need for flash-erasing a block which has the defective block flag.

A valid flag which indicates how many of the individual logical pages belonging to the same physical page where the redundancy portion is located stores invalid user data is stored in the redundancy portion through a process to be discussed later. The cases where user data stored in a logical page is invalid include, for example, a case where updated data of the data is stored in another logical page in the flash memory 11.

It is to be noted that the valid flag indicating that one logical has no invalid data stored therein can be updated to show that this logical page is having invalid data if the flag is overwritten.

Every 64 physical pages starting from the top constitute a single block. Each block has 256 logical pages to which consecutive page addresses from "0" to "255" are allocated. The entire memory area of the flash memory 11 comprises 1,024 blocks which are given consecutive physical block addresses of "0" to "1023".

The value of a logical address which is allocated to each logical page in each physical page is stored in the redundancy portion of that physical page. The logical address is a unit which is recognized as a data reading/writing unit by the controller 12 when the flash memory 11 is read or written through an operation to be discussed later.

The logical address of a logical page consists of, for example, upper digits (logical block address) indicating a block to which the logical page belongs and lower digits (page address) indicating the location of the logical page in the block. The total number of logical addresses is a predetermined value, for example, 256,000, smaller than the total number of logical pages the flash memory 11 physically has (there are 1,024 blocks each containing 256 logical pages, which amounts to the total number of 262,144 logical pages).

When the flash memory 11 is instructed to erase data in a specific block by the controller 12 of the memory unit 1, it flash-erases the memory contents of all the memory cells that are included in the block. (Specifically, in case where the flash memory 11 is of a NAND type, the memory value of each memory cell is set to "1".)

A directory, FAT (File Allocation Table) and write pointer initial value are stored in the logical page of the flash memory 11, and are renewed by a process to be discussed later.

The logical page where the directory, FAT and write pointer initial value are stored is given a logical address which meets a predetermined condition. Specifically, for example, the top 4,096 addresses (i.e., addresses 0h to FFFh) are given as a logical address. (Throughout the specification and in the drawings, a numeral with a letter "h" affixed to the end represents a hexadecimal numeral.)

Figure 3:
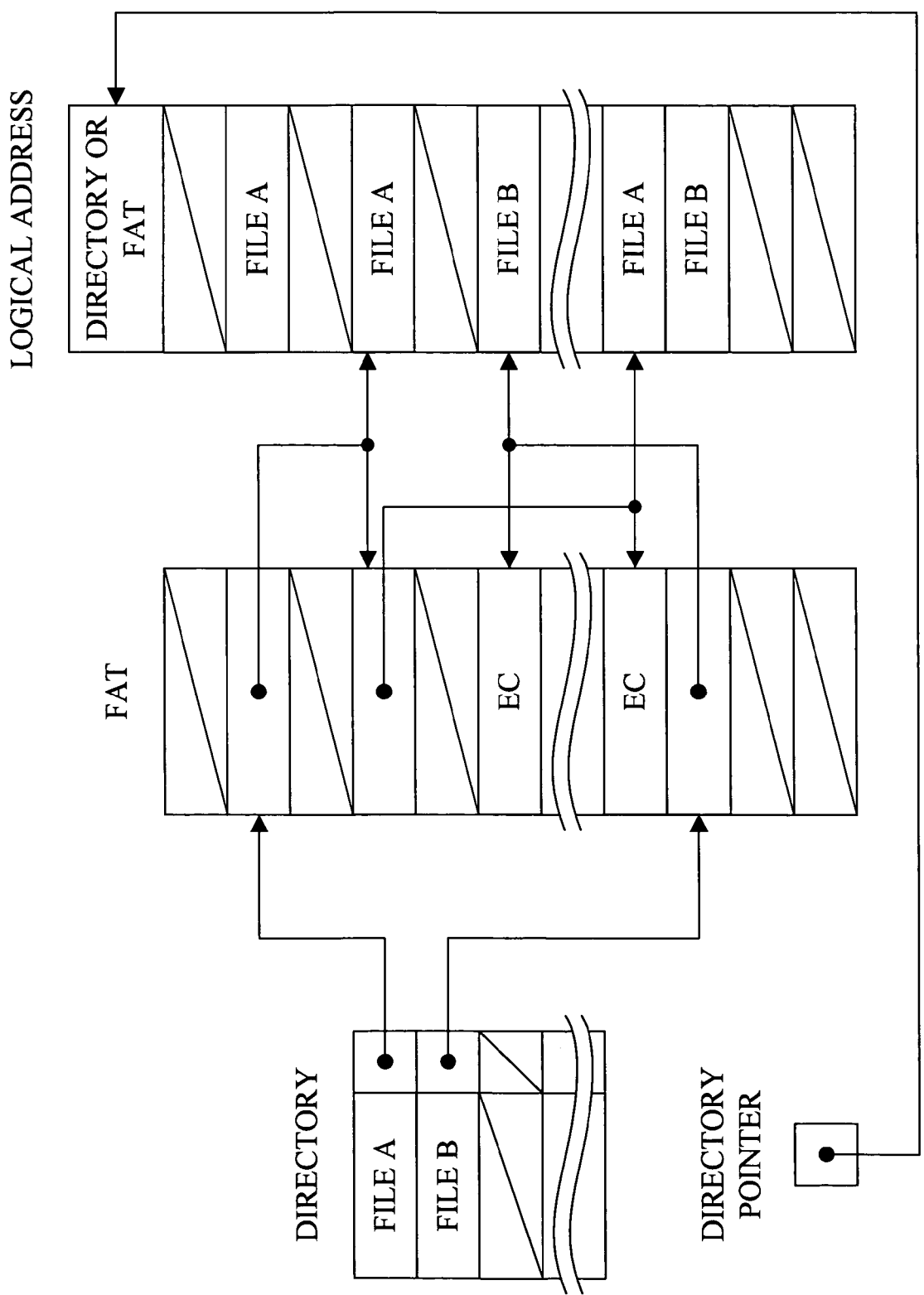
FIG. 3 is a diagram exemplarily showing the data structures of a directory and FAT.

FIG. 3 is a diagram showing the correlation among the directory, FAT and logical block address. As illustrated, the logical address of the logical page where the directory, FAT and write pointer initial value are stored is pointed by, for example, a directory pointer stored in a CPU (Central Processing Unit) 121 (or stored in a RAM (Random Access Memory) 123 by the CPU 121).

The directory is a table showing the names of files stored in the flash memory 11 (i.e., a collection of data designated by the computer 2 as a collective target to be handled) and logical addresses of logical pages where the head portions of the files are stored.

The FAT is a table indicating the layout of files in the memory area in the flash memory 11 and indicates the logical address of a logical page which stores a subsequent part as shown in FIG. 3 when a file does not fit in one logical page. The logical address of the logical page where the last part of a file is stored is given an end code (EC) as shown in FIG. 3 to indicate that the logical page address represents the last part.

The write pointer initial value represents the latest value of a write pointer (to be discussed later) which is a variable indicating a logical page where the CPU 121 should write user data, and designates the logical page where user data should be written at the time the memory system writes the user data in the flash memory 11 for the first time after having been activated.

The controller 12 has the CPU 121, a ROM (Read Only Memory) 122 and the RAM 123, as shown in FIG. 1. The RAM 123 is comprised of, for example, SRAM (Static RAM).

The CPU 121 is connected to the ROM 122, RAM 123 and flash memory 11 and is connected to the computer 2 via the PCMCIA slot provided in the computer 2.

The CPU 121 performs processes to be discussed later in accordance with processes executed by a program prestored in the ROM 122 by the manufacturer or the like of the controller 12.

When acquiring a command supplied from the computer 2 which constitutes an access device, the CPU 121 executes the command. Commands the CPU 121 executes include a command to access the flash memory 11.

The memory area the RAM 123 has is used as a work area for the CPU 121 and includes a saving memory area. The memory area further stores a BSI (Block Search Index) and BPT (Block Pointer Table) which are generated by the CPU 121 in processes to be discussed later and a write pointer.

The saving memory area is a memory area to temporarily store data stored in a block which includes a logical page to be subjected to writing in a data writing process to be discussed later.

The BSI stores information that specifies which one of the individual blocks included in the memory area of the flash memory 11 is an empty block (i.e., a block which has been flash-erased and is no long storing user data). The BSI is generated and renewed (by the controller 12) according to processes of the controller 12 to be discussed later.

Figure 4:
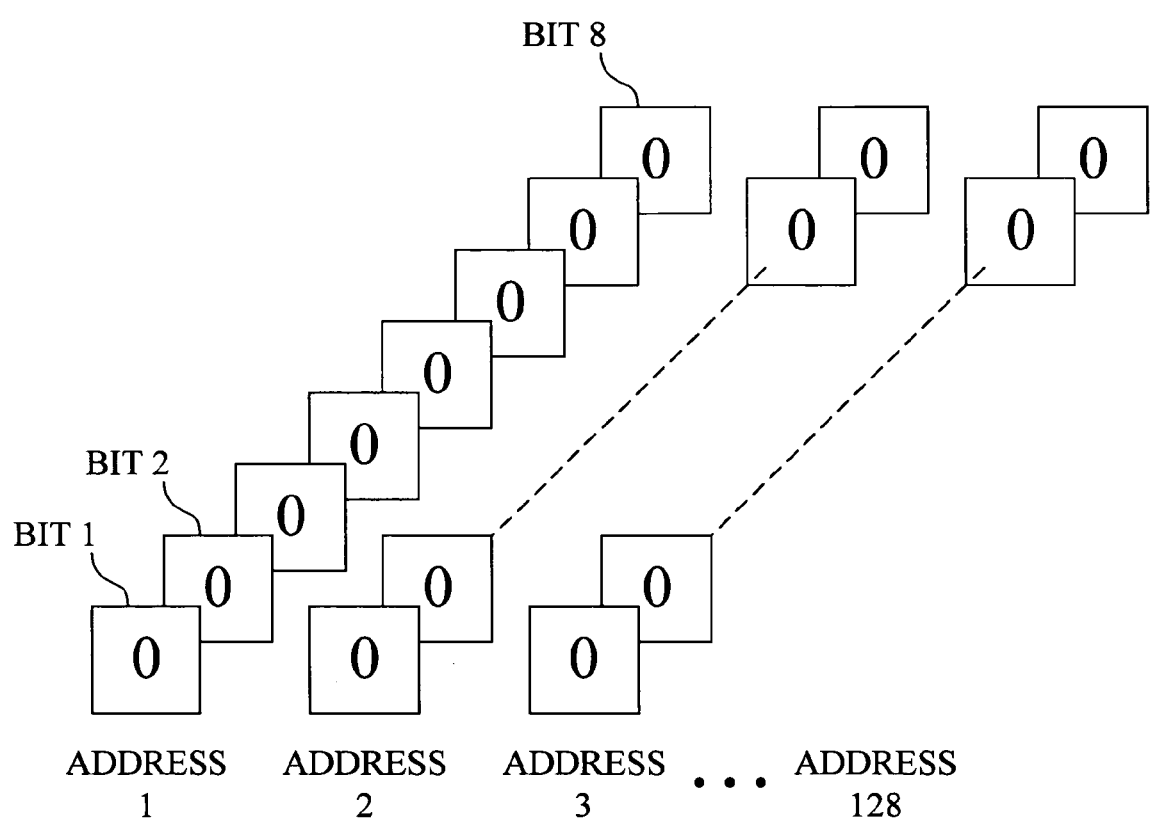
FIG. 4 is a diagram exemplarily showing the data structure of a BSI (Block Search Index).

FIG. 4 shows one example of the structure of the BSI when the total number of blocks in the flash memory 11 is 1,024. As illustrated, the BSI consists of data of one Kbytes, with their bits being associated, one to one, with the first block to the 1024-th block in order from the top bit. The BSI stores "1" when the associated block is an empty block and "0" when the block is not an empty block.

The BPT stores information on each logical page showing the correlation between the logical address and physical address of that logical page. The BPT is generated or renewed according to a process (to be discussed later) which is executed by the CPU 121.

Figure 5:
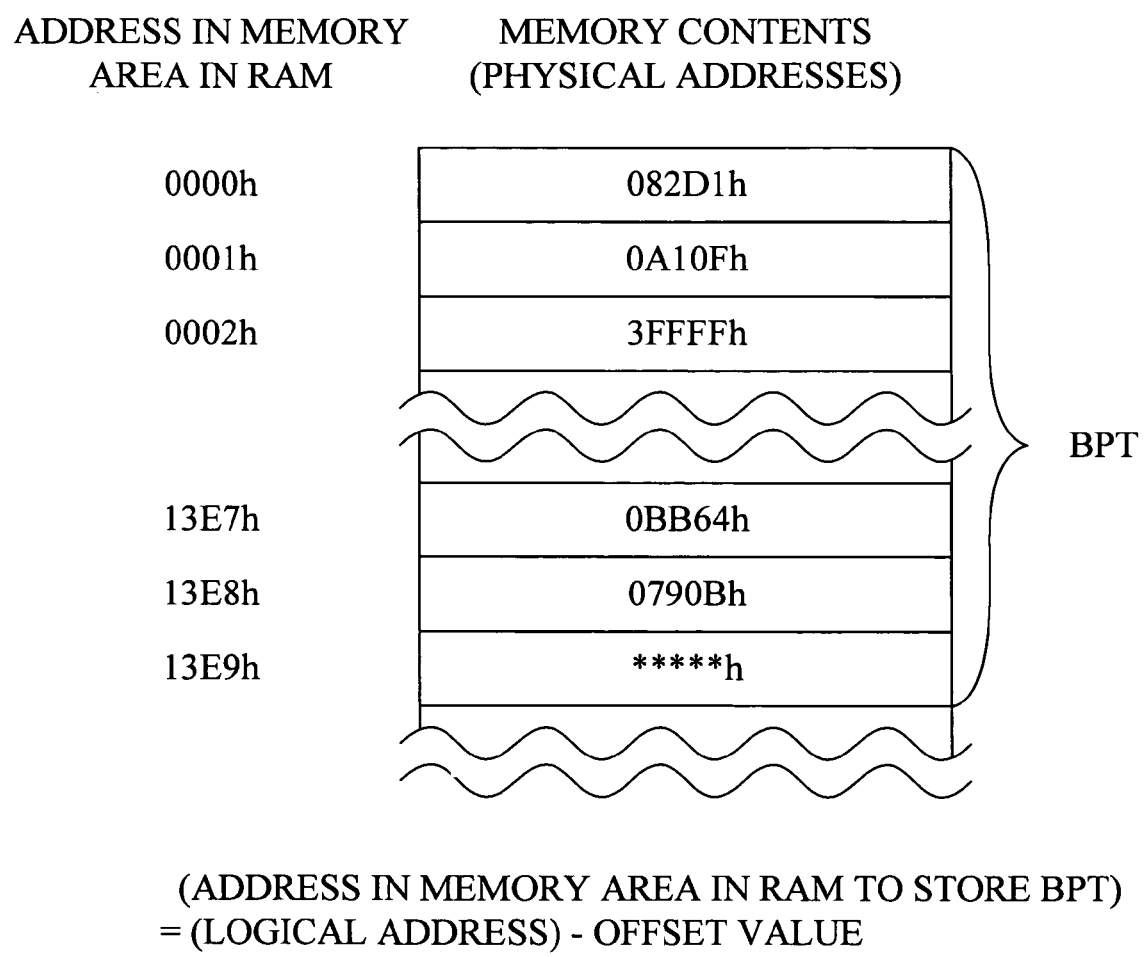
FIG. 5 is a diagram exemplarily showing the data structure of a BPT (Block Pointer Table).

Specifically, the BPT has a data structure as shown in FIG. 5, for example.

The BPT has a memory area which occupies a predetermined position in the memory area in, for example, the RAM 123 and stores physical addresses associated with the respective logical addresses. Given that there are 256,000 logical addresses in total, as illustrated, the memory area of the BPT should have a size of a total of 576,000 bytes with addresses 0h to 3E7FFh each given every 18 bits starting from the top.

In case where the BPT has the data structure shown in FIG. 5, each of the addresses allocated to the memory area that forms the BPT is equal to the sum of the logical address and a predetermined offset value.

The content of each 18-bit memory area to which an associated address is allocated represents the physical address (a set of a physical block address and a page address) of a logical page associated with the logical address indicated by the address of the 18-bit memory area.

Suppose that, as shown in FIG. 5, a value "0A10Fh" is stored in the memory area to which the address 0001h is allocated and the offset value is "0000h". In this case, a logical address "0001h" is associated with the logical page whose physical address is "0A10Fh" (the physical block address is "0A1h" and the page address is "0Fh").

In case where the content stored in a memory area allocated with an associated address represents a predetermined value (e.g., in case where the content represents the physical address value of "3FFFFh" as illustrated), no physical address is associated with the logical address indicated by the address of the memory area where the value is stored.

The write pointer is a variable (pointer) which points a logical page where the CPU 121 should write user data and specifically indicates the physical address of the associated logical page. The value of the write pointer is updated according to a process to be discussed later.

The computer 2 is comprised of a personal computer or the like, has the PCMCIA slot, has an OS and program data, representing drivers, stored therein, and executes the OS after being powered on. When the computer 2 detects the installment of the memory unit 1 in the PCMCIA slot, it activates the drivers according to the processes of the OS.

The computer 2 which executes the processes of the drivers supplies the controller 12 with the aforementioned commands or supplies the flash memory 11 with data to be written and allows the CPU 121 to access the flash memory 11. The computer 2 acquires, from the CPU 121, data which has been read from the flash memory 11 and supplied to the computer 2 by the CPU 121 in response to the command sent from the computer 2.

(Operation)

The operation of this memory system will be described below referring to FIGS. 6 to 10.

Figure 6:
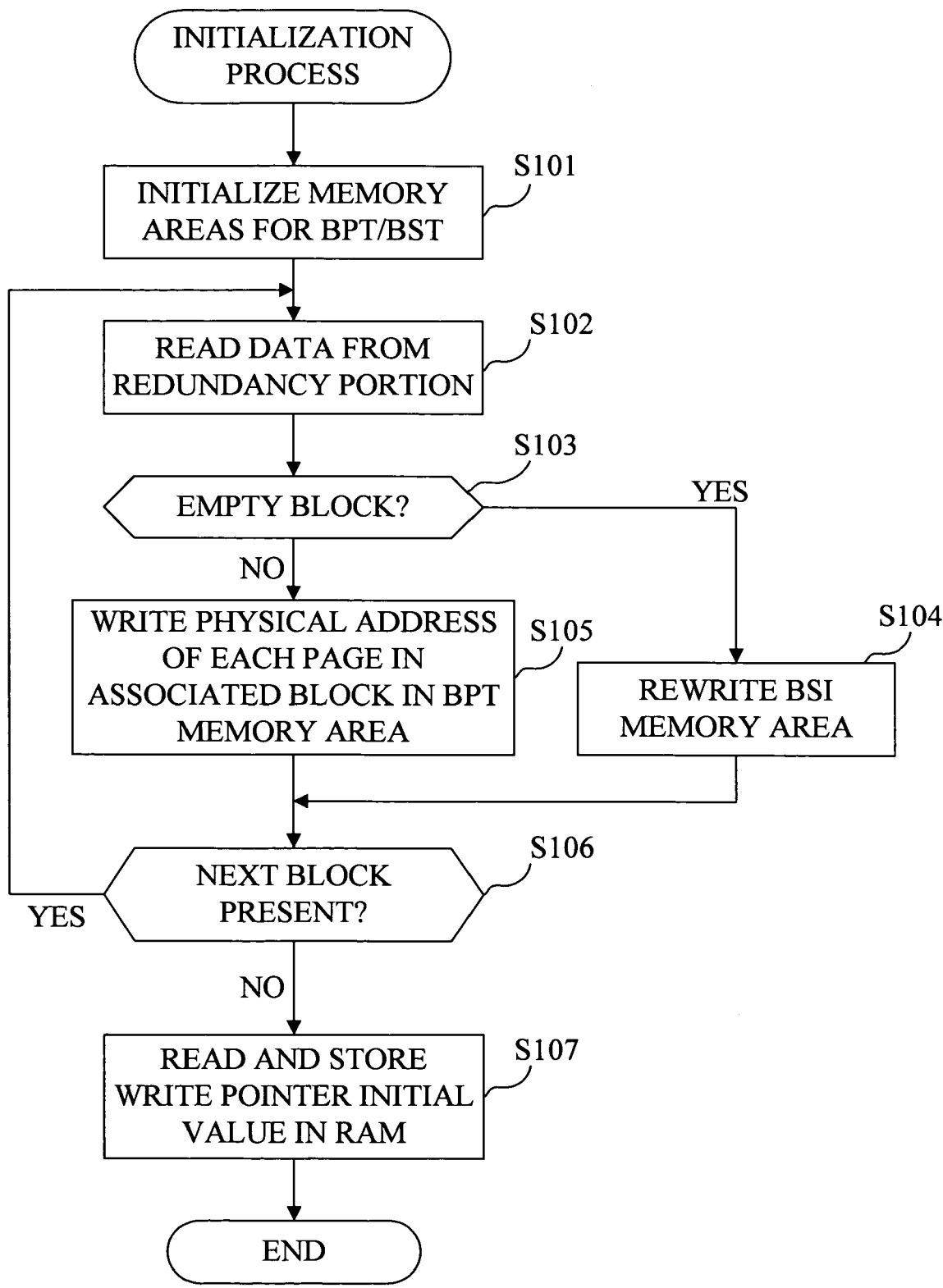
FIG. 6 is a flowchart illustrating an initialization process.
Figure 7:
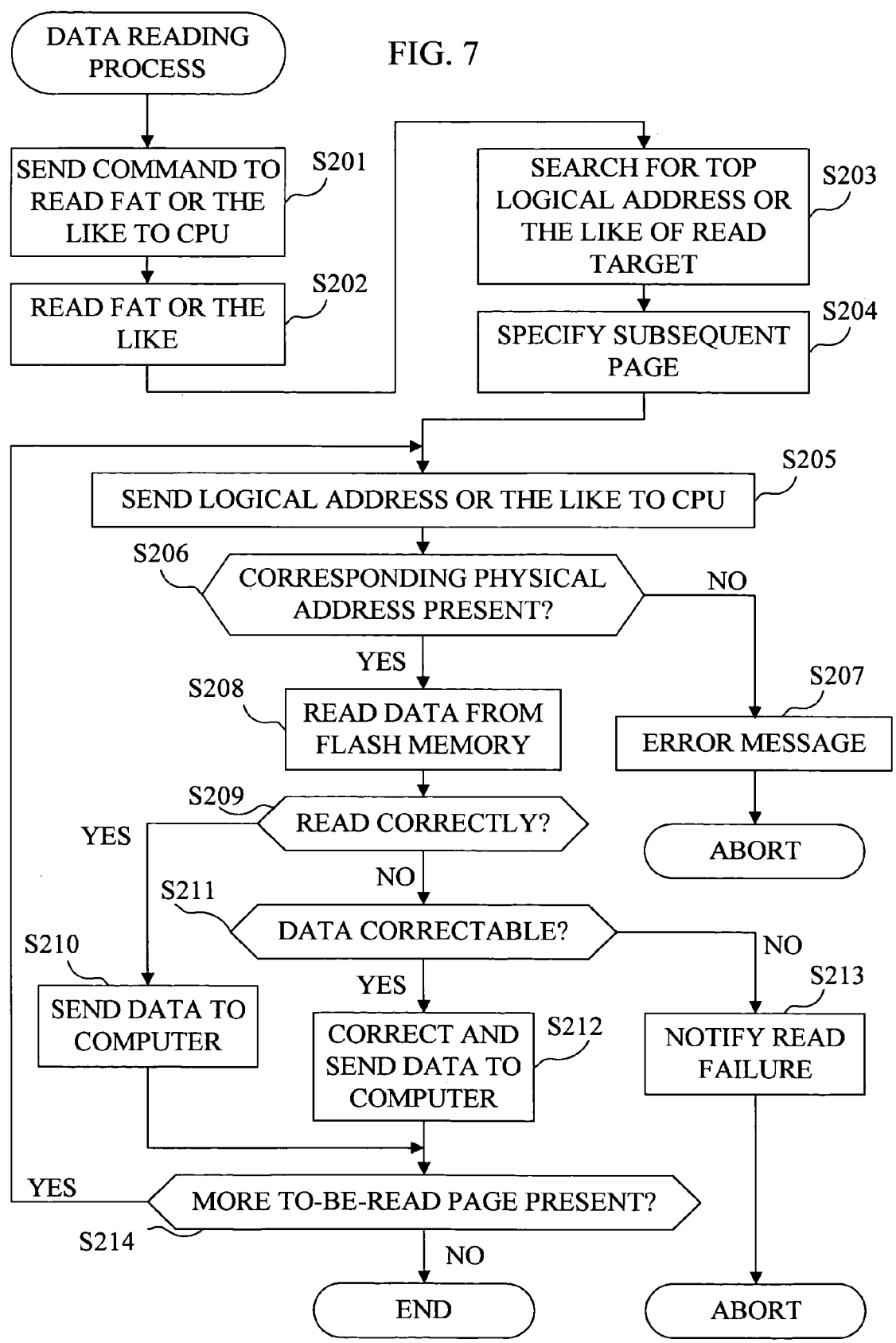
FIG. 7 is a flowchart illustrating a data reading process.
Figure 8:
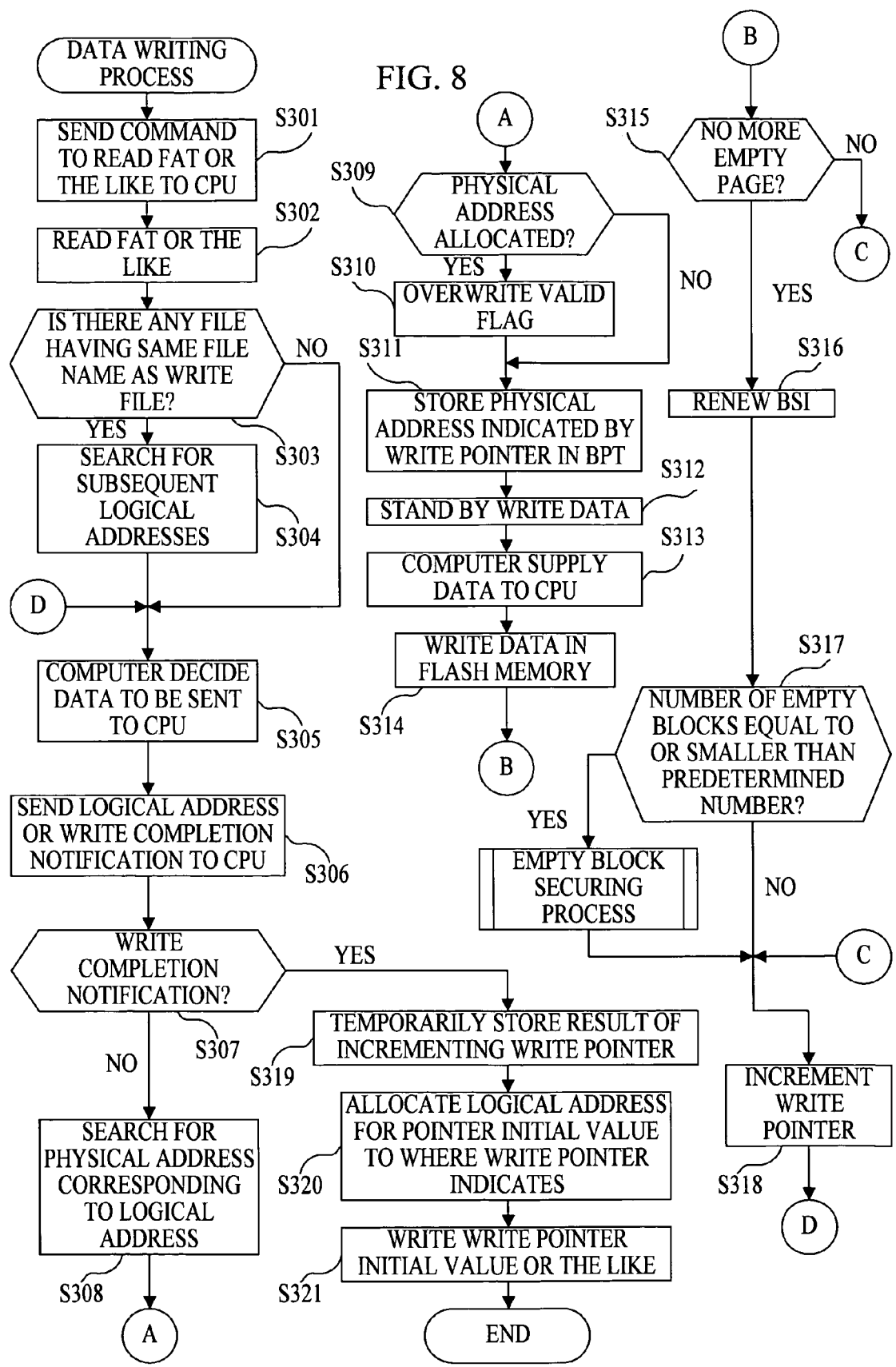
FIG. 8 is a flowchart illustrating a data writing process.
Figure 9:
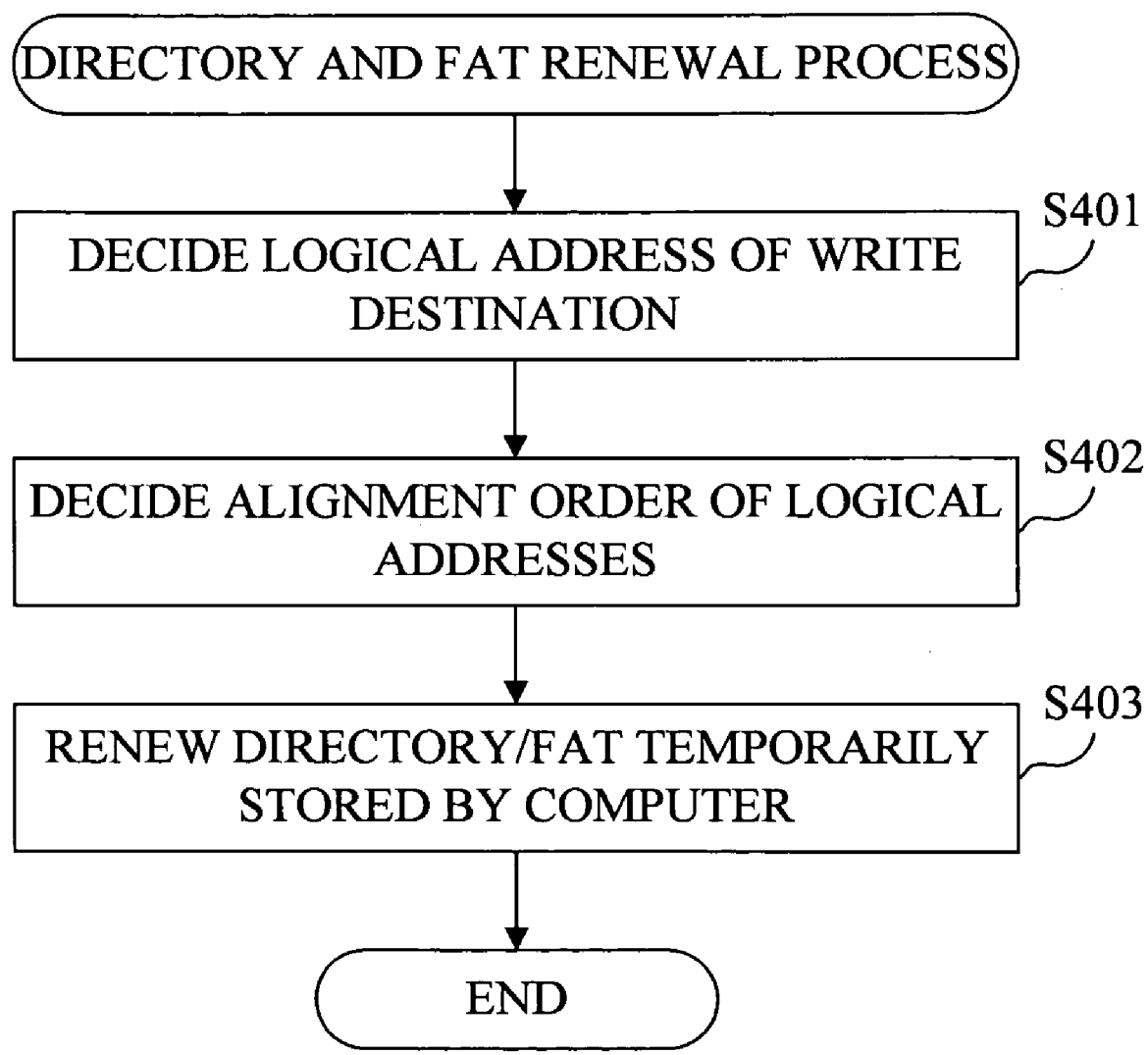
FIG. 9 is a flowchart illustrating a directory and FAT renewal process.
Figure 10:
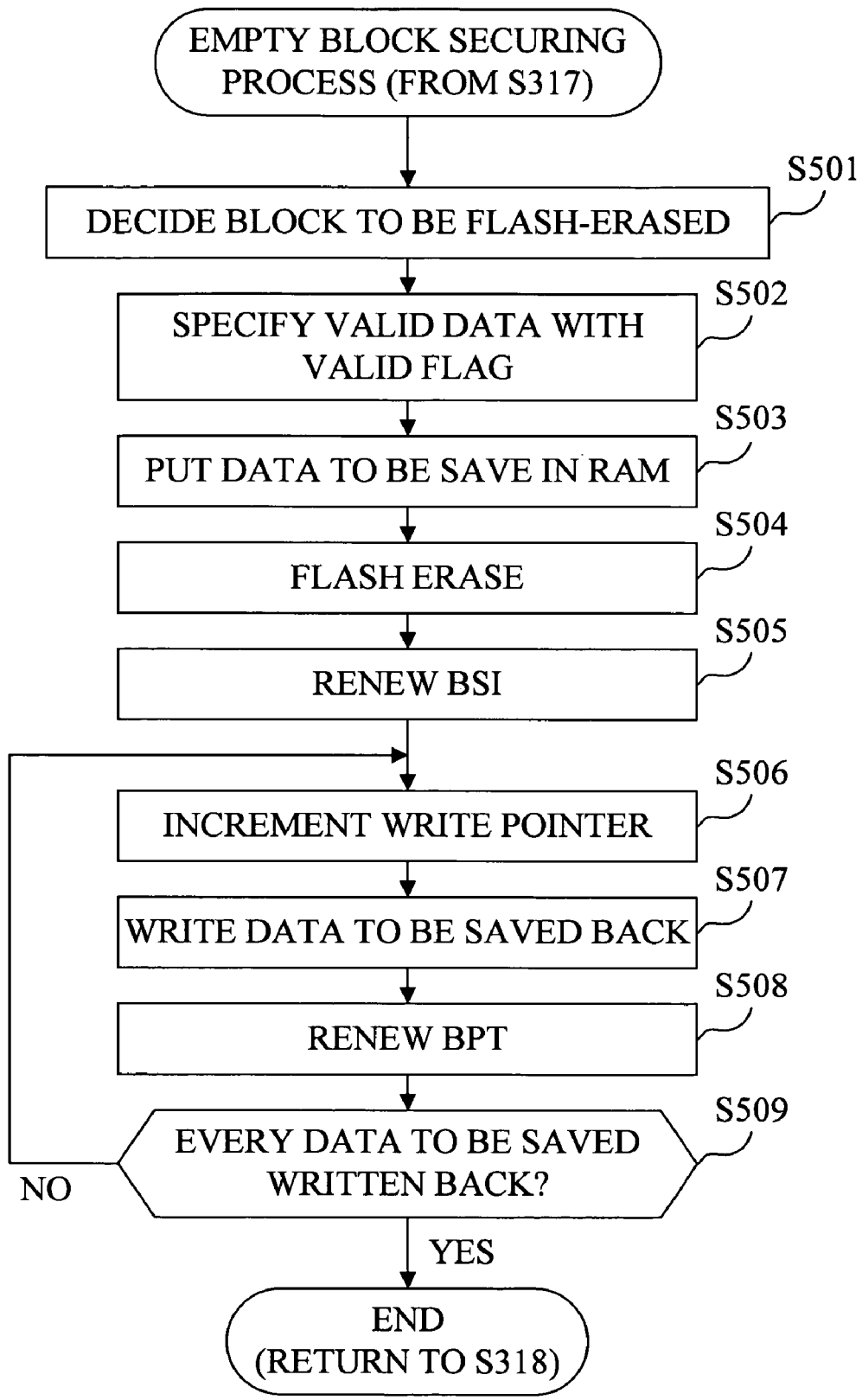
FIG. 10 is a flowchart illustrating an empty block securing process.

FIG. 6 is a flowchart illustrating an initialization process. FIG. 7 is a flowchart illustrating a data reading process. FIG. 8 is a flowchart illustrating a data writing process. FIG. 9 is a flowchart illustrating a directory and FAT renewal process. FIG. 10 is a flowchart illustrating an empty block securing process.

Initialization Process

As the memory system is activated, the CPU 121 of the controller 12 in the memory unit 1 executes the initialization process shown in FIG. 6.

As the initialization process starts, the CPU 121 initializes those portions in the memory area in the RAM 123 where the BPT and BSI are stored (step S101 in FIG. 6).

In step S101, specifically, the CPU 121 writes a predetermined value (e.g., the aforementioned value "3FFFFh"), which indicates that a physical address is not associated with each 18-bit area indicated by the aforementioned address, in that portion in the memory area in the RAM 123 where the BPT is stored. The CPU 121 sets the values of all the bits of the portion where the BSI is stored to "0".

Next, the CPU 121 specifies a block with the youngest physical block address from among those blocks from whose redundancy portions data has not been read out yet and reads every data stored in the redundancy portions of the individual physical pages which belong to the specified block (step S102).

Then, based on the data read in step S102, the CPU 121 discriminates whether the block from which data has been read out in step S102 is an empty block or not (step S103). Specifically, for example, the CPU 121 discriminates whether the data read out in step S102 is an empty block code (e.g., the aforementioned "3FFFFh") of a predetermined format or not. When the CPU 121 discriminates that the read block is not an empty block, the CPU 121 moves the process to step S105.

When the CPU 121 discriminates in step S103 that the read block is an empty block, the CPU 121 computes, from the physical block address indicating the block, the position in the memory area of the RAM 123 where the bit in the BSI which indicates the status of the block occupies. Then, the CPU 121 rewrites the value of the position-computed bit with "1" (step S104). When the process of step S104 is done, the CPU 121 moves the process to step S106.

Meantime, in step S105, the CPU 121 writes the physical address of each logical page whose logical address has been read out from the redundancy portion of the flash memory 11 in the memory area of the RAM 123. The logical position (in the RAM 123) where the CPU 121 writes the physical address of the logical page in step S105 is the portion to which an address equivalent to the logical address read from that logical page, read from the redundancy portion, is given. Accordingly, new information indicating the correlation between the physical address and the logical address is added to the BPT.

When completing the process of step S105 for all the logical addresses read from the same block in the flash memory 11, the CPU 121 moves the process to step S106.

In step S106, the CPU 121 discriminates whether or not there is a next block to the block from whose redundancy portion data has been read out in step S102. The CPU 121 returns the process to step S102 when having discriminated that there is a next block, but moves the process to step S107 when having discriminated that there is no next block.

In step S107, the CPU 121 accesses a logical page where the write pointer initial value is stored, reads the write pointer initial value and stores the value in the RAM 123, after which the CPU 121 terminates the initialization process.

Through the above-described initialization process, the BSI and BPT are generated and the write pointer initial value is specified.

(Data Reading Process)

As the initialization process is completed, the CPU 121 in the memory unit 1 accepts a read instruction to access the flash memory 11 from the computer 2.

To instruct the CPU 121 to read data from the flash memory 11, the computer 2 first supplies the CPU 121 with a read command to read a directory and FAT and the logical address of each logical page where the directory and FAT are stored (step S201 in FIG. 7).

The CPU 121, supplied with the command to read data and the logical address, searches the BPT for the physical address of each logical page where the directory and FAT are stored with the logical address as a key, reads data constituting the directory and FAT from each logical page indicated by the searched physical address and supplies the data to the computer 2 (step S202). The computer 2 temporarily stores the directory and FAT supplied from the CPU 121.

Next, to search for the logical address of the top logical page where the file content which has the file name of a file containing to-be-read data is stored, the computer 2 searches the directory, supplied from the CPU 121 and temporarily stored, with the file name as a key (step S203).

Next, with the logical address searched in step S203 as a key, the computer 2 searches the FAT supplied from the CPU 121 to retrieve all logical addresses of logical pages, if present, which follow the page whose logical address has been retrieved, and specifies the consecutive order of the logical pages (step S204).

Then, to read the memory contents of the logical pages retrieved in steps S203 and S204, the computer 2 supplies the CPU 121 with a read command and the logical address of that logical page from which user data should be read out (i.e., the top one of the logical pages which have been retrieved in steps S203 and S204 and from which data has not been read out yet) (step S205).

When supplied with the read command and the logical address in step S205, the CPU 121 accesses the RAM 123 and searches the BPT with the logical address supplied from the computer 2 in step S205 as a key to discriminate whether or not there is a physical address associated with the logical address (step S206).

When having discriminated that there is no such a physical address, the CPU 121 supplies an error message (e.g., a predetermined "FFh") to the computer 2 (step S207) and terminates the data reading process (abort).

When having discriminated that there is such a physical address, the CPU 121 reads data from the logical page indicted by the physical address and reads the ECC of that logical page from the redundancy portion of the same physical page to which the logical page belongs (step S208).

Then, the CPU 121 generates an ECC based on that data in the data read in step S208 which is stored in the logical page and discriminates whether or not the data stored in the logical page has been read out correctly, based on the generated ECC and an ECC in the read data which has been stored in the redundancy portion (step S209).

When having discriminated in step S209 that the data was read out correctly, the CPU 121 supplies data stored in the logical page to the computer 2 (step S210).

When having discriminated that the data was not read out correctly, the CPU 121 discriminates whether or not the data stored in the logical page can be corrected to the correct content based on the ECC or the like stored in the redundancy portion (step S211). When having discriminated that data restoration would be possible, the CPU 121 corrects the data stored in the logical page and supplies the corrected data to the computer 2 (step S212).

When having discriminated in step S211 that correction would not be possible, the CPU 121 overwrites the defective block flag stored in the redundancy portion of the same physical page to which the logical page from which the uncorrectable data has been read belongs (or the redundancy portion of another arbitrary physical page in the same block to which the former logical page belongs) with a value representing a later-generated defective block and notifies the computer 2 of failure of data reading (step S213). Upon reception of the notification, the computer 2 interrupts the data reading process (abort).

When the computer 2 receives to-be-read data from the CPU 121 in step S210 or S212, the computer 2 discriminates whether or not there is any logical page remaining from which user data should be read out (step S214). Then, the computer 2 returns the process to step S205 when having discriminated that there is such a logical page remaining, and terminates the process when having discriminated that there remains no such a logical page.

Through the above-described processes of steps S201 to S214, data is read from the flash memory 11 and supplied to the computer 2.

(Data Writing Process)

In case of writing data in the flash memory 11, first, to read a directory and FAT, the computer 2 first supplies the CPU 121 with a read command and the logical address of each logical page where the directory and FAT are stored as done in the step S201 (step S301 in FIG. 8). It is to be noted however that in case where the directory and FAT have temporarily been stored already for some purpose, such as reading data, the process of step S301 is omitted and the data writing process starts at step S303.

The CPU 121, supplied with the command to read data and the logical address, performs substantially the same process as that of the step S202 to read the directory and FAT and supplies them to the computer 2 (step S302). The computer 2 temporarily stores the directory and FAT supplied from the CPU 121.

Next, with the file name of the file to be written in the flash memory 11 as a key, the computer 2 searches the directory supplied from the CPU 121 and discriminates whether or not the file name is stored in the directory (step S303). When the decision is negative, the computer 2 moves the process to step S305 to be discussed later.

When the decision in step S303 is affirmative, on the other hand, the computer 2 searches the FAT supplied from the CPU 121 using the logical address, associated with the file name retrieved in the searching in step S303, as a key. Then, the computer 2 retrieves the logical address of each logical page which holds data indicated by the file name and temporarily stores the logical address (step S304), and moves the process to step S305.

In step S305, the computer 2 decides data to be supplied to the CPU 121 in steps S306 and S313 to be discussed later.

Specifically, in step S305, the computer 2 first discriminates whether or not writing of the to-be-written file has been completed. When the decision is negative, the computer 2 decides to supply one logical page of data which is included in data contained in the to-be-written file and which has not been written in the flash memory 11 yet in step S313 and decide to supply the logical address (the logical address of the write destination) of the logical page that holds this data in step S306.

When having discriminated that writing of the to-be-written file has been completed, on the other hand, the computer 2 discriminates whether or not the directory and FAT, temporarily stored therein, have been written in the flash memory 11. When having discriminated that the writing has not been finished, the computer 2 decides to supply one logical page of data constituting the directory and FAT, temporarily stored in the computer 2, in step S313 and decide the logical address (the logical address of the write destination) of the logical page where the directory and FAT should be stored.

When the computer 2 has discriminated that writing of the directory and FAT has been completed too, the computer 2 decides to supply predetermined data to notify the completion of the writing in step S306.

In step S306, the computer 2 supplies the logical address of the to-be-written logical page to store data or notification of the completion of writing in accordance with the result of the decision made in step S305. In case of supplying the logical address, the computer 2 also supplies a command to write one logical page of data in the flash memory 11.

In case where the computer 2 has decided to supply data contained in the to-be-written file in step S313, the computer 2 executes the directory and FAT renewal process shown in FIG. 9 to decide the logical address to be supplied to the CPU 121 in step S306 and renewal of the directory and FAT.

That is, the computer 2 first analyzes the directory and FAT temporarily stored therein and specifies logical addresses of logical pages where data is not written (i.e., the logical addresses which are not associated with the file name) by the quantity required for storing to-be-written data as logical addresses that should be allocated to the to-be-written logical pages (step S401 in FIG. 9).

When having discriminated in step S303 that the file name of the to-be-written file is included in the directory, the computer 2 may specify the logical address associated with this file name (i.e., the logical address temporarily stored in step S304) by priority as the logical address of the logical page where data is to be written.

Next, the computer 2 decides the aligning order of the individual logical addresses specified in step S401 (step S402). This aligning order represents the aligning order of the individual logical pages to which those logical addresses are allocated and represents the aligning order of data written in those logical pages.

When the computer 2 has carried out the processes of steps S401 and S402, the controller 12 has only to supply the CPU 121 with the logical address which is included in those logical addresses specified in step S401 and not having supplied to the CPU 121 yet and which corresponds to the top in the aligning order decided in step S402.

Next, the computer 2 stores the logical address specified in step S401 in the directory and FAT, temporarily stored in the computer 2, in such a way as to take the data structure shown in FIG. 3 (step S403). The relationship between addresses precedent and subsequent to the logical address represented by the directory and FAT should match the order specified in step S401. The process of step S403 generates a directory and FAT to be newly written in the flash memory 11.

When the CPU 121 is supplied with data, such as the logical address of the write destination or notification of completion of writing, from the computer 2 in step S306, the CPU 121 discriminates whether or not notification of completion of writing is included in those data (step S307 in FIG. 8). The CPU 121 moves the process to step S319 when the decision is affirmative and carries out processes starting at step S308 when the decision is negative.

In step S308, the CPU 121 accesses the RAM 123 and searches the BPT for the physical address of the logical page that is indicated by the logical address supplied from the computer 2. Then, the CPU 121 discriminates whether or not the physical address has been retrieved in step S308 (step S309) and moves the process to step S311 when the decision is negative.

When having discriminated in step S309 that the physical address has been retrieved, the CPU 121 accesses the flash memory 11, updates the valid flag in the redundancy portion of the physical page to which the logical pages having the retrieved physical address allocated thereto in such a way as to indicate that those logical pages have invalid data stored therein (step S310), and moves the process to step S311. In step S310, the CPU 121 accesses the RAM 123 and renews the physical address specified in step S308 to a value indicating that the physical address has not been associated yet (e.g., the aforementioned value "3FFFFh"). That is, the allocation of the logical address to this logical page is relieved.

In step S311, the CPU 121 accesses the RAM 123 and stores the physical address currently pointed by the write pointer in the BPT in such a form as to be associated with the logical address of the write destination supplied from the computer 2. Then, the CPU 121 stands by for the supply of one logical page of data to be written in the flash memory 11 from the computer 2 (step S312).

When data to be written in the flash memory 11 is supplied from the computer 2 (step S313), the CPU 121 accesses the flash memory 11 and writes one logical page of data supplied from the computer 2 in the logical page that is currently pointed by the write pointer (step S314). In step S314, the CPU 121 writes, as the logical address of this logical page, the logical address supplied from the computer 2 in step S306 in the redundancy portion of the same physical page to which that logical page belongs.

Next, the CPU 121 accesses the RAM 123 and discriminates whether or not the page in which data has been newly written in step S314 is the end page of the block containing this page, based on, for example, the current value of the write pointer (step S315). When having discriminated that the page in question is not the end page, the CPU 121 moves the process to step S318.

When having discriminated in step S315 that the page where data has been newly written is the end page of the block, on the other hand, the CPU 121 renews the content of the BSI stored in the RAM 123 in such a way as to indicate that this block is not an empty block (step S316).

Next, the CPU 121 determines whether or not the block should be flash-erased to secure an empty block based on an arbitrary reference (step S317). For example, the CPU 121 has only to count the number of current empty blocks based on the content of the BSI, decide that an empty block should be secured when the number of empty blocks is equal to or smaller than two and decide that an empty block need not be secured when the number of empty blocks is equal to or greater than three.

The CPU 121 moves the process to step S318 when having decided that an empty block need not be secured, but initiates the empty block securing process shown in FIG. 10 when having decided that an empty block should be secured.

As the empty block securing process starts, the CPU 121 specifies one or more blocks from which data is to be flash-erased to turn them to empty blocks (step S501 in FIG. 10).

The reference for determining a block to be flash-erased by the CPU 121 in step S501 is set arbitrarily; for example, the CPU 121 has only to determine, as a target to be flash-erased, a non-empty block (a block other than an empty block) which is included in those blocks subsequent to the latest block that has been flash-erased to become an empty block (i.e., blocks that are given physical block addresses larger than the physical block address of the latest block) and which has the smallest physical block address. In case where there is no such a non-empty block, however, that one of all the non-empty blocks in the flash memory 11 which has the smallest physical block address is to be flash-erased.

Next, the CPU 121 specifies every logical page in the individual logical pages in the block specified in step S501 which holds valid user data by referring to the valid flag stored in the redundancy portion of each physical page in the specified block (step S502). Then, the CPU 121 reads user data (to-be-saved data) from each logical page specified in step S502 and stores the data in the RAM 123 (step S503). In step S503, the CPU 121 also reads the logical address of each logical page specified in step S502 and the ECC of the to-be-saved data from the redundancy portion and stores them in the RAM 123.

Next, the CPU 121 flash-erases the block specified in step S501 to turn it to an empty block and writes an empty block code in the redundancy portion of each physical page in the block that has just become an empty block (step S504). (It is to be noted however that in case where the flash memory 11 is of a NAND type and the empty block code consists only of bits which have values of "1, it is not particularly necessary to execute the operation of writing the empty block code.)

The CPU 121 accesses the RAM 123 and renews the content of the BSI in such a way as to indicate that this block is an empty block (step S505).

Next, the CPU 121 increments the write pointer (step S506). Specifically, by referring to the redundancy portion of the physical page that contains those logical pages which follow the logical page currently pointed by the write pointer, the CPU 121 specifies the top one of those logical pages which follow the logical page currently pointed by the write pointer and have no logical addresses written in the redundancy portion. Then, the CPU 121 renews the value of the write pointer stored in the RAM 123 in such a way as to point the physical address of the specified logical page. In case where the logical page currently pointed by the write pointer is the end logical page of the block, however, the CPU 121 should search the BSI to specific a new single empty block, specify the top logical page of the specified empty block and renew the value of the write pointer stored in the RAM 123 in such a way as to point the physical address of the specified top logical page in step S506.

Next, the CPU 121 writes new to-be-saved data back (step S507). That is, of those pieces of to-be-saved data stored in the RAM 123 in step S503, one logical page of data which has not been written back into the flash memory 11 is written in the logical page that is currently pointed by the write pointer. The CPU 121 may erase that portion of the to-be-saved data which has been written back into the flash memory 11 from the memory area of the RAM 123.

In step S507, the CPU 121 writes the logical address allocated to the logical page where new to-be-saved data which should be written back has been stored before, in the redundancy portion of the physical page which contains the logical page currently pointed by the write pointer as the logical address of that logical page.

Next, the CPU 121 accesses the RAM 123 stores the physical address currently 10 pointed by the write pointer (i.e., the physical address of the logical page where to-be-saved data has newly been written) in the BPT in association with the logical address of the logical page where to-be-saved data has newly been written in step S507 (step S508).

Next, the CPU 121 discriminates whether or not every to-be-saved data has been written back (step S509) and returns the process to step S506 when having discriminated that some to-be-saved data has not been written back.

When having discriminated in step S509 that every to-be-saved data has been written back, the CPU 121 terminates the empty block securing process and increments the write pointer in the same way as done in the process of step S506 (step S318) and stands by for the supply of the logical address of the next write destination or notification of completion of writing from the computer 2.

As the CPU 121 goes to the mode to sand by for the supply of the logical address of the next write destination or notification of completion of writing from the computer 2, the computer 2 returns the process to step S305. Then, when the logical address of the next write destination or notification of completion of writing from the computer 2 is supplied from the computer 2 in step S306, the CPU 121 returns the process to step S307.

As the CPU 121 moves the process to step S319 upon reception of the notification of completion of writing, the CPU 121 performs a process similar to the process of step S506 to acquire the result of incrementing the current value of the write pointer stored in the RAM 123 and temporarily stores the result. It is to be noted that the write pointer does not increment itself.

Next, the CPU 121 stores the physical address currently pointed by the write pointer in the BPT in such a form as to be associated with the physical address (the logical address for the pointer initial value) that is allocated to the logical page where the write pointer initial value is stored (step S320).

Next, the CPU 121 writes the value obtained in step S319 as the write pointer initial value in the data area of the page currently pointed by the write pointer (step S321). In step S321, the logical address for the pointer initial value is written in the redundancy portion of the same physical page to which this logical page belongs, as the logical address of the logical page.

When the process of step S321 is finished, the memory system terminates the data writing process.

Through the above-described processes, data supplied from the computer 2 is stored in the flash memory 11. The content of the BSI is changed in such a way as to indicate an empty block which has been newly generated as a result of writing data and indicate a vanished empty block. Meantime, the content of the BPT is also changed and the logical address that has been allocated to a logical page having stored valid user data in that block which has newly become an empty block is newly allocated to that logical page whose content has been transferred.

In this memory system, in case where user data is to be renewed, old user data is specified as invalid by the valid flag instead of being erased. Therefore, the memory system does not require inefficient flash erase of blocks at the time of renewal, thus making the degrading of the flash memory 11 harder to occur.

In case where valid user data is to be transferred in order to secure an empty block, the process proceeds without involving reading of data from the logical page that is specified as invalid by the valid flag. This can allow an empty block to be secured faster.

The structure of the memory system is not limited to the one described above.

For example, the number of blocks in the memory area of the flash memory 11, the number of logical pages per block, the memory capacity of each logical page and the memory capacities of the logical page and redundancy portion are all arbitrary. Further, the flash memory 11 should not necessarily be constituted by an EEPROM but may be any memory device readable and writable by a computer.

The logical addresses of logical pages where the directory and FAT are stored need not take the aforementioned value, and the number of logical pages where the directory and FAT are stored is arbitrary.

The redundancy portion in the flash memory 11 should not necessarily be located at the end of each physical page but may be provided at any location in the physical page or the location of the redundancy portion may be allocated dynamically.

The RAM 123 may be a non-volatile memory constituted by, for example, FeRAM (Ferroelectric RAM). In this case, the memory system may not require the initialization process if the BSI and BPT have already been stored in the RAM 123. That is, the BPT and BSI should not necessarily be generated every time the memory system is activated.

The CPU 121 should not necessarily be connected to the computer 2 via the PCMCIA slot but may be connected to the computer 2 via an IEEE 1394 interface or USB (Universal Serial Bus) or any other interface. The CPU 121 should not necessarily be connected to the computer 2 by a cable but may wirelessly be connected to the computer 2 via an interface which conforms to the standards, such as Bluetooth (registered trademark).

The flash memory 11 should not necessarily be fixed inside the memory unit 1, but may be connected to, for example, the controller 12 in a detachable manner. In this case, the flash memory 11 and the controller 12 should be constructed in such a way as to be connected together via, for example, terminals similar to the terminals of a smart medium (registered trademark) and its drive unit, or terminals similar to the terminals of a compact flash (registered trademark) and its drive unit.

Figure 11:
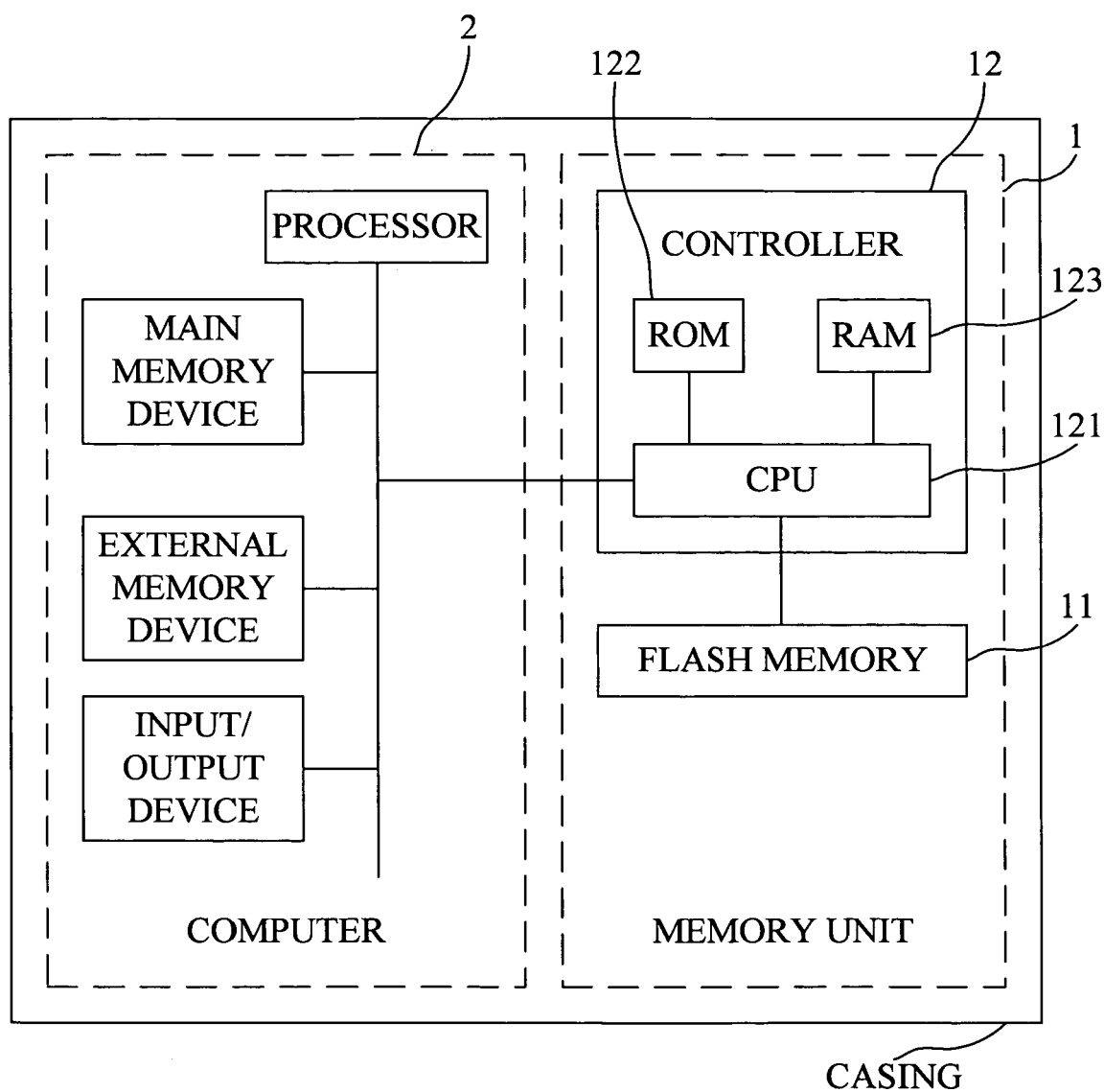
FIG. 11 is a block diagram illustrating the structure of a modification of the memory system in FIG. 1.

The installed memory unit 1 and the computer 2 may be connected to each other in a fixed manner or the memory unit 1 and the computer 2 may be assembled in the same casing as shown in FIG. 11.

While the embodiment of the invention has been described above, the memory system of the invention is not limited to an application-specific system but may be realized by using an ordinary computer system. For example, a memory system which executes the above-described processes can be constructed by installing a program for executing the above-described processes into a personal computer having a slot to mount the flash memory 11 from a medium (flexible disk, CD-ROM or the like) having the program stored therein.

The program may be uploaded to, for example, a BBS via a communication circuit and distributed via the communication circuit. Alternatively, a carrier wave may be modulated with a signal representing the program, the obtained modulated wave may be transmitted and a device which receives the modulated wave may demodulate the modulated wave to restore the program.

Then, the above-described processes can be executed by activating the program and executing the program in the same manner as other application programs under the control of the OS.

In case where the OS performs some of the processes, or the OS constitutes a part of a single structural element of the invention, the program excluding that portion may be stored in the recording medium. It is premised in this case too that a program for performing the individual functions or steps which are executed by a computer is stored in the recording medium in the invention.

The invention is based on Japanese Patent Application No. 2002-179902 filed on Jun. 20, 2002, and includes the specification, claims, drawings and abstract of that application. The present specification incorporates what is disclosed in the application entirely by reference.

INDUSTRIAL APPLICABILITY

The invention can be adapted to a memory device which is readable and programmable by a computer.

The invention claimed is:

1. A memory device characterized by comprising:
   a non-volatile memory including a plurality of memory blocks which stores data and each of which is comprised of one or more physical pages each including one or more logical pages and a redundancy portion; and a controller which, when to-be-written data is supplied to said memory device, writes said to-be-written data in that empty logical page in said logical pages which is in a data storable state, discriminates whether to-be-replaced data to be replaced with said to-be-written data is stored in said logical pages, and writes validity data indicating that said to-be-replaced data is not valid in that physical page which includes said logical page that stores said to-be-replaced data, when having discriminated that said to-be-replaced data is stored in said logical page.

2. The memory device according to claim 1, characterized in that when information for specifying a to-be-read logical page to be read out is supplied to said memory device, said controller specifies said to-be-read logical page based on said information, reads data from said specified to-be-read logical page and sends said read data outside.

3. The memory device according to claim 1, characterized in that physical addresses are allocated to said logical pages, said memory device further comprises a second memory which is randomly accessible and stores an address translation table representing a correlation between said physical addresses of said logical pages and logical addresses to be used to specify said logical pages by an external unit, and a third memory which is randomly accessible and stores a write pointer that points the empty logical page in said logical pages which is in a data storable state and instructs the physical address of said specified empty logical page, when this memory device is activated, said controller reads the redundancy portions of said non-volatile memory and prepares the address translation table in said second memory and the write pointer in said third memory; and when to-be-written data and a logical address are supplied to said memory device, said controller writes said to-be-written data in said empty logical page pointed by said write pointer, and renews said address translation table in such a way as to show a correlation between said physical address of said empty logical page and said logical address.

4. The memory device according to claim 1, characterized in that said controller writes said validity data in an area which is not included in any one of logical pages in that physical page which includes said logical page that stores said to-be-replaced data.

5. The memory device according to claim 3, characterized in that said controller writes validity data indicating that said written to-be-written data is valid in the physical page which includes the logical page where said to-be-written data is stored, specifies the logical page where data is not stored based on said validity data and treats said specified logical page as said empty logical page.

6. The memory device according to claim 5, characterized in that said controller discriminates whether or not data stored in each of said logical pages in to-be-erased memory blocks is valid based on said validity data, specifies that logical pages which are located in another memory blocks and where data is not stored and transfers that data which has been discriminated as valid into said specified logical pages, and erases data stored in said to-be-erased memory blocks.

7. The memory device according to claim 6, characterized in that when information for specifying a to-be-read logical page to be read out is supplied to said memory device, said controller specifies said to-be-read logical page based on said information, reads data from said specified to-be-read logical page and sends said read data outside.

8. The memory device according to claim 4, characterized in that when information for specifying a to-be-read logical page to be read out is supplied to said memory device, said controller specifies said to-be-read logical page based on said information, reads data from said specified to-be-read logical page and sends said read data outside.

9. A memory managing method of managing a non-volatile memory including a plurality of memory blocks which stores data and each of which is comprised of one or more physical pages each including one or more logical pages and a redundancy portion, characterized by comprising the steps of:

writing, when to-be-written data is supplied to said memory, said to-be-written data in that empty logical page in said logical pages which is in a data storable state; and discriminating whether to-be-replaced data to be replaced with said to-be-written data is stored in said logical pages, and writing validity data indicating that said to-be-replaced data is not valid in that physical page which includes said logical page that stores said to-be-replaced data, when it is discriminated that said to-be-replaced data is stored in said logical page.

10. The memory managing method according to claim 9, characterized in that validity data indicating that said written to-be-written data is valid is written in that physical page which includes the logical page where said to-be-written data is stored, that logical page where data is not stored is specified based on said validity data and said specified logical page is treated as said empty logical page.

11. The memory managing method according to claim 10, characterized by further comprising the steps of: discriminating whether or not data stored in each of said logical pages in to-be-erased memory blocks is valid based on said validity data, specifying logical pages which are located in another memory blocks and where data is not stored, transferring the data which has been discriminated as valid into said specified logical pages, and erasing data stored in said to-be-erased memory blocks.

12. A computer-readable medium storing a program for allowing a computer, connected to a non-volatile memory including a plurality of memory blocks which stores data and each of which is comprised of one or more physical pages each including one or more logical pages and a redundancy portion, to function to:

write, when to-be-written data is supplied to said memory, said to-be-written data in that empty logical page in said logical pages which is in a data storable state; and discriminate whether to-be-replaced data to be replaced with said to-be-written data is stored in said logical pages, and write validity data indicating that said to-be-replaced data is not valid in that physical page which includes said logical page that stores said to-be-replaced data, when it is discriminated that said to-be-replaced data is stored in said logical page.

* * * * *